United States Patent [19]

Rangaswamy

[11] 4,334,587

[45] Jun. 15, 1982

[54] OFFSET WALKING SPUD

[75] Inventor: Krishnaswamy Rangaswamy, Wheaton, Ill.

[73] Assignee: Page Engineering Company, Chicago, Ill.

[21] Appl. No.: 171,259

[22] Filed: Jul. 22, 1980

[51] Int. Cl.³ ............................................. B62D 57/02
[52] U.S. Cl. .................................. 180/8 R; 180/8 E
[58] Field of Search .................. 180/8 R, 8 B, 8 BA, 180/8 D, 8 E; 305/1, 2, 3

[56] References Cited

U.S. PATENT DOCUMENTS

| | | | |
|---|---|---|---|
| 1,577,588 | 3/1926 | Phillips | 180/8 A |
| 2,290,118 | 7/1942 | Page | 180/8 D |

*Primary Examiner*—John A. Pekar

*Attorney, Agent, or Firm*—Wegner, McCord, Wood & Dalton

[57] ABSTRACT

An improved walking mechanism for a drag line excavator. The drag line excavator has a tub intended to rest upon ground with a house and boom rotatable on the tub. Movement of the excavator is accomplished by large spuds at each side of the house each carrying an elongate shoe for ground contact when the spud is lowered by a crank to raise a part of the machine off the ground and drag the rest over the ground in incremental "steps" to move the excavator. The present invention provides a structure allowing the machine to pick up a greater proportion of the excavator weight relative to the weight to be dragged over the ground without changes in the walking mechanism power and drive and without changes affecting the location of the walking center of gravity or the working center of gravity of the excavator.

6 Claims, 4 Drawing Figures

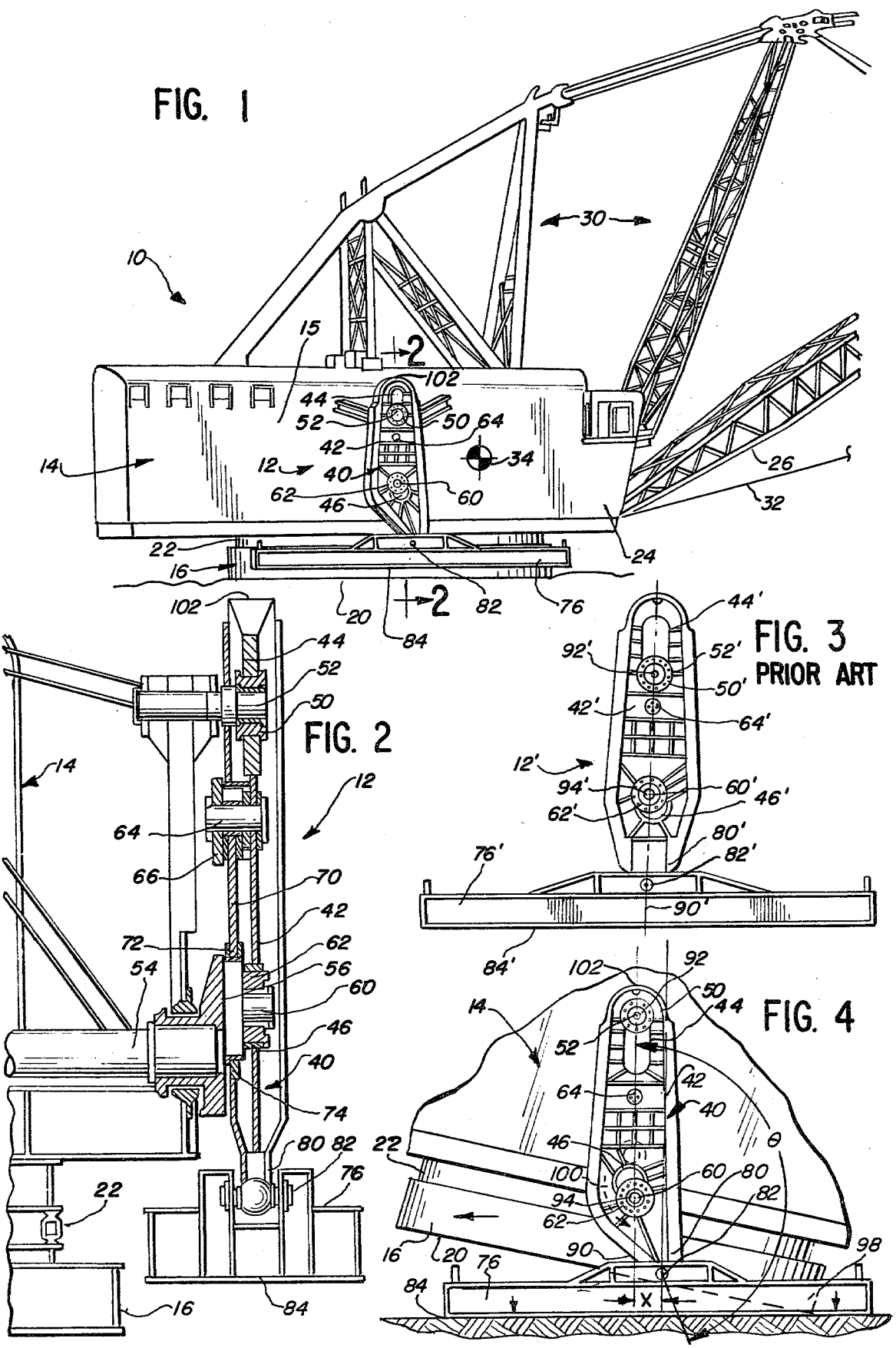

OFFSET WALKING SPUD

BACKGROUND OF THE INVENTION

1. Field of the Invention

This invention relates to a walking mechanism for heavy machinery and, more specifically, this invention relates to a walking spud for a drag line excavator or like equipment.

2. Description of the Prior Art

The use of walking mechanisms for limited relocation of heavy equipment, such as drag line excavators, is well known. Such equipment is typically extremely large and heavy so that movement by means such as towing, or on wheels or tracks, is impractical.

Typically, such equipment is constructed on site on a concrete pad adjacent an area to be excavated. One form of drag line excavator comprises a main frame mounted for rotation about a vertical axis on a stationary support frame or tub which rests on the underlying terrain. A long excavating boom supported by the main frame extends from a forward end thereof. When excavation of an area forward of the excavator is complete, the excavator is moved to the rear by means of a walking mechanism comprising a pair of generally vertically spaced hinge and rotatable eccentric crank pins projecting horizontally from each side of the main frame. Mounted on each pair of pins for sliding translational and rotational movement with the crank pin is an upright spud attached at its lower end to a longitudinally extending shoe. Typically, the excavator's center of gravity is disposed forwardly of the spud.

The crank pin is rotated so as to raise and lower the shoe relative to the ground. The crank rotates to move the excavator relative to the shoe when the shoe is pressed against the ground. The crank lifts the shoe (once the excavator sits back on the ground) and moves the shoe back to a new location. During lifting and dragging of the excavator, the weight of the excavator is supported by the spud and shoe so that the excavator is first lifted and then dragged to the rear. As the crank pin cycle of rotation is completed, the supporting frame is lowered as the shoe is lifted from the terrain.

One widely used form of prior walking mechanism is described in Page U.S. Pat. No. 2,164,120 issued June 27, 1939, the details of which are incorporated herein by reference. In prior walking mechanisms of the type described above, the horizontal axis of the hinge pin, the axis of eccentricity of the crank pin and the point of attachment of the spud to the shoe defined a generally vertical line. In prior walking drag lines, the forward end or toe of the excavator's supporting frame applied a bulldozing effect to the underlying terrain during walking, thereby building up a mound of earth beneath the tub. This bulldozing effect was quite substantial, since about ⅓ or more of the excavator's weight was concentrated at the toe of the tub in prior excavators during the walking movement. The resulting build-up of earth below the tub is undesirable since it is preferred that the excavator be disposed on a level plane after the walking movement.

SUMMARY OF THE INVENTION

It is an object of the invention to overcome one or more of the problems described above.

According to the present invention, a spud of a walking mechanism in a drag line excavator or the like is provided wherein the spud's point of attachment to a shoe is offset from the vertical axis defined by the horizontal axis of a hinge pin and the axis of eccentricity of the crank pin on which the spud is mounted.

More particularly, the horizontal hinge pin axis, the axis of eccentricity of the crank pin, and the point of attachment of the shoe to the spud define a somewhat varying angle of substantially less than 180° opening toward the excavator's center of gravity. The crank pin is preferably disposed intermediate the hinge pin and the spud's lower end and defines the angle's apex.

Thus, the point of force application in the excavator's walking movement is effectively shifted toward the excavator's center of gravity. Such a shift in the point of force application results in a reduction in the proportion of the excavator's weight applied to the terrain at the supporting frame's forward end, thus reducing the bulldozing effect applied to the terrain during walking.

Furthermore, even though a relatively greater proportion of the excavator's weight is supported during walking by the spud and shoe, the torque required to effect walking movement with the invention is no greater than required with the use of prior spuds and, in some cases, may be lower. This is believed to be due to the decrease in torque required for translation, which decrease is substantially greater than any increase in required lifting torque.

A particularly important advantage of the present invention is the ability to lift a greater proportion of the drag line's weight during walking without changes in the working center of gravity or the walking center of gravity of the machine.

Other objects and advantages of the present invention will become apparent from the following detailed description and the accompanying drawings.

BRIEF DESCRIPTION OF THE DRAWINGS

FIG. 1 is an elevation of a walking drag line excavator incorporating the offset walking spud of the invention;

FIG. 2 is a vertical section of the walking mechanism of the excavator of FIG. 1 taken approximately along line 2—2 of FIG. 1;

FIG. 3 is an elevation of a prior walking spud and shoe assembly; and

FIG. 4 is a fragmentary elevation of the excavator of FIGS. 1 and 2 during walking movement.

DETAILED DESCRIPTION OF THE PREFERRED EMBODIMENT

Referring to the Figures, a drag line excavator, generally designated 10, incorporating a walking mechanism, generally designated 12, is illustrated. The excavator 10 comprises a main frame 14 including a house 15 supported for rotation about a vertical axis by an underlying support frame or tub 16 in contact with the underlying terrain. The tub 16 is preferably circular and has a generally flat terrain-engaging lower surface 20. The main frame 14 is rotated upon a circular rail and roller assembly 22 with a lower rail on the tub 16 and an upper rail on the main frame with the rollers therebetween.

Fixed to and extending from a forward end 24 of the main frame 14 is a boom 26. Fixed supporting mast structures 30 extend upwardly and forwardly from the main frame 14, and a drag line 32 extends from the frame end 24 to excavating means such as a drag line bucket (not shown), suspended from the forward end of the boom 26 by lift lines as is well known in the art.

The working center of gravity 34 (diagrammatically illustrated) of the excavator 10 is located toward the forward main frame end 24 but inside the roller circle support of the main frame on the tub. The main frame, which houses motive means, gear boxes and the like, and the boom and supporting structure 26, 30 typically weigh upwards of 500 tons.

A walking mechanism 12 is disposed on each side of the main frame 14, and comprises a walking spud 40 which in turn comprises an upstanding leg 42 defining a pair of upper and lower slots 44, 46 for mounting the leg 42 on the main frame 14, as described below.

The upper slot 44 receives a flanged upper roller 50 carried by a hinge pin 52 which projects generally horizontally outwardly from a side of the main frame 14. The leg 42 is free for limited pivotal and reciprocal movement relative to the hinge pin 52. A rotatable crank shaft 54 projects horizontally from the main frame 14 and carries a radial crank 56 which in turn carries an eccentric crank pin 60. A lower roller 62 is carried by the crank pin 60, and is received by the lower slot 46.

A hanger pin 64 is fixed to the leg 42 intermediate the hinge pin 52 and the crank pin 60. A plate 66 parallel to the leg 42 is fixed to one end of the hanger pin 64, and a hanger 70 is captured between the plate 66 and the leg 42. A lower end 72 of the hanger 70 defines an annular collar 74 surrounding the crank 56 for support thereon.

A longitudinally extending shoe 76 is secured at its approximate longitudinal midpoint to the leg 42 at its lowermost end 80 as by a transversely extending pin 82 received by the end 80 and the shoe 76. The shoe 76 includes a flat ground-engaging surface 84.

As best seen in FIG. 4, the horizontal axis of the pin 82 is offset toward the working center of gravity 34 from a generally vertical axis 90 defined by the horizontal axis 92 of the hinge pin 52 and the axis of eccentricity 94 of the crank pin 60. The axes 92 and 94 and the pin 82 define an angle $\theta$ of less than 180°, with the axis 94 defining the apex of the angle. The angle $\theta$ opens toward the working center of gravity 34.

As shown in FIG. 4, the angle $\theta$ is substantially less than 180°. However, it will be apparent that the size of the angle will vary somewhat during rotation of the crank pin 60 since the spud 42 reciprocates and pivots relative to the hinge pin 52, and the crank pin 60 has limited travel in the slot 46. The advantages obtained from the foregoing construction are described in detail below.

Referring to FIG. 3, a prior art spud construction is shown. (The reference numerals in FIG. 3 are designated with primes and otherwise correspond to those of FIGS. 1-2 and 4.) A vertical axis 90' defined by the axes 92' and 94' intersects the point of attachment 82' of the shoe 76' to the lower spud end 80'. The invention resides in an appreciation of the benefits obtainable by displacement of the point of attachment 82' from the vertical axis 90' toward the working center of gravity 34.

When rearward repositioning of the excavator 10 (toward the left as seen in FIG. 1) is desired, the crank pins 60 are rotated in unison so as to translate the shoes 76 to the rear. In the case of the walking mechanism of FIGS. 1 and 4, the illustrated crank pin 60 is rotated in a counterclockwise direction (as shown by the arrow 100 in FIG. 3). The crank pin on the opposite side of the frame 14 is rotated in a clockwise direction. The shoes touch the ground together and lift from both sides together.

As the crank pin 60 is rotated from the position shown in FIG. 1 to that of FIG. 4, the shoe 76 moves rearwardly and engages the underlying terrain when the crank pin 60 reaches approximately the 9 o'clock position. At that point, most of the weight of the excavator 10 is transferred to the hanger pin 70 (FIG. 2) and the rotational torque applied by the crank pin 60 results in at first, pure lifting of the rear of the excavator 10.

Before the walking movement is begun, the drag line bucket (not shown) suspended from the boom 26 and attached to the drag line 32 is lowered to the underlying terrain in order to decrease the total weight to be lifted during walking. Since the bucket is supported during the walking movement by the terrain, the excavator's walking center of gravity is located rearwardly of the working center of gravity, but still forwardly of the axis 90 near the vertical rotational axis of the main frame 14.

As the excavator is lifted to the point shown in FIG. 4, the tub 16 pivots about its front end or toe 98, since the excavator's walking center of gravity is located forwardly of the axis 90. Continued rotation of the crank pin 60 results in rearward translational movement of the excavator 10 across the underlying terrain with the tub's toe 98 in contact with the terrain. In prior spud constructions, such as shown in FIG. 3, lifting movement does not begin until the crank passes an angular position approximately 120° from the vertical or corresponding to the 8 o'clock angular position; thus, the mechanical advantage of the invention's structure will be apparent to those skilled in the art.

Surprisingly, it has been found that, with the use of the offset walking spud of FIGS. 1-2 and 4, the proportion of the excavator's weight supported on the tub's toe 98 is reduced from about 33% to about 15% at mid-step, thus significantly reducing the bulldozing effect of the tub 16 as it is dragged across the terrain.

Although the torque required to lift the tub from the position shown in FIG. 1 to that of FIG. 4 is greater than the lifting torque required with the prior art spud construction of FIG. 3, it has been found that the reduction in required translational torque outweighs the increase in lifting torque such that the total torque required for the walking movement is reduced.

In typical drag line excavators of the type illustrated in the Figures and now in commercial use, the walking mechanism 12 generally effects a 6 to 7 foot step during each crank pin rotation cycle. Minimal or no reduction in step length is effected with the spud construction of FIGS. 1-4, regardless of the offset length $\chi$ (FIG. 4).

The advantages of the invention's spud construction are believed to be the result of a shift of the point of the shoe's force application toward the center of gravity without a shift in the excavator's weight balance. No machinery is moved within the house of the main frame, only the structure of the spud is changed.

The height of the spud 12 of FIGS. 1-2 and 4 taken from the point 82 to the upper end 102 of the spud may in practice be between about 35 and 40 feet. In such a spud, the offset $\chi$ (see FIG. 4) may be selectively varied from slightly more than zero to five feet or more. It has been found that the magnitude of the downward force applied to the terrain by the tub's toe 92 at the start of a step decreases with an increased offset length $\chi$ to the point where maximum initial lift is encountered. Also, the rate of weight transfer from the tub to the shoe increases with increasing offset $\chi$. With a 38 ft. high spud 12 on an excavator such as shown in FIGS. 1-2 and 4, the ideal offset χ is about five feet.

The offset walking spud construction as described herein provides several advantages relative to alternative means of reducing the magnitude of tub front end loading in an excavator. One alternative is to reposition the walking mechanism 12 and associated gearing forwardly of the position shown in FIG. 1 in order to decrease the proportion of weight supported by the tub's toe 98 during walking.

However, due to the substantial weight of the spud and crank assembly and its associated gearing, such repositioning would result in a substantial shift of the working center of gravity 34 to a point forward of the position shown in FIG. 1, near or outside of the periphery roller circle main frame support on the tub 16.

Location of the working center of gravity 34 near or outside the roller circle is unsatisfactory since, in such a condition, the weight of the excavator is not uniformly distributed over the entire area of the tub lower surface 84, resulting in nonuniform application of stress to the roller circle and, consequently, inefficient operation.

To avoid undesirable forward repositioning of the working center of gravity 34, ballast could be added to the rear of the main frame 14. However, this would result in an increase in weight of the excavator and, thus, in the power required for walking. Further, of course, a rearward shift in the working center of gravity 34 due to the addition of ballast frustrates the original objective of moving the spud and crank assembly and associated machinery forward of the position shown in the Figures.

It is thus apparent that the offset spud assembly as described herein provides a means of increasing the proportion of an excavator's weight supported on the shoes of a walking mechanism without changes in the excavator's working or walking centers of gravity.

The foregoing detailed description is given for clearness of understanding only and no unnecessary limitations should be understood therefrom, as modifications will be obvious to those skilled in the art.

I claim:

1. In a walking mechanism for an excavator or the like, said excavator comprising a main frame having a center of gravity, said walking mechanism comprising:
a hinge pin and a rotatable eccentric crank pin projecting substantially horizontally from a side of said main frame, said pins being spaced generally vertically from each other and defining a generally vertical axis pivotal about the horizontal axis defined by said hinge pin and spaced longitudinally from said center of gravity;
an upright leg having a lower end and means mounting said leg to said pins for movement of said leg with said vertical axis; and
a longitudinally extending shoe mounted to said lower leg end for movement therewith, the improvement wherein said shoe is attached to said leg lower end at a point spaced longitudinally from said vertical axis toward said center of gravity.

2. The improvement of claim 1 wherein said crank pin is disposed between said hinge pin and said lower leg end and defines a somewhat varying angle in cooperation with said hinge pin and said point at the lower leg end, said crank pin being the apex of the angle and said angle being substantially less than 180° and opening toward said center of gravity.

3. In combination:
a drag line excavator or the like having a main frame with a center of gravity, a walking mechanism comprising a hinge pin and an eccentric crank pin, each said pin projecting substantially horizontally from a side of said excavator and said pins cooperating to define a generally vertical axis, said crank pin being spaced generally vertically from said hinge pin, and a spud mounted on said pins for movement therewith, said spud comprising an upright leg having a lower end and means at said lower end for attaching said lower end to a longitudinally extending shoe at a point spaced from the generally vertical axis defined by said pins towards said center of gravity, one of said pins being disposed intermediate the other said pin and said attachment means with said point, the horizontal axis of said hinge pin, and the axis of eccentricity of said crank pin defining a somewhat varying angle of less than 180° opening toward said center of gravity.

4. The combination of claim 3 wherein said crank pin is disposed intermediate said hinge pin and said attachment means, and rotates so as to effect walking movement of said excavator in a direction away from said center of gravity.

5. A walking spud for use in a walking dragline excavator or the like, said excavator including a hinge pin and a rotatable eccentric crank pin spaced vertically from said hinge pin, said spud comprising an upright leg mounted to said hinge pin, said crank pin and an attachment point on a longitudinally extending shoe such that said attachment point is displaced longitudinally from an axis extending through said hinge and crank pins.

6. The spud of claim 5 wherein said hinge pin, crank pin and point define an angle of less than 180°.

* * * * *